(12) United States Patent
Nelson et al.

(10) Patent No.: US 8,777,307 B2
(45) Date of Patent: Jul. 15, 2014

(54) CUP HOLDER

(76) Inventors: Jeff Nelson, Lebanon, OH (US); Jenise Nelson, Lebanon, OH (US)

( * ) Notice: Subject to any disclaimer, the term of this patent is extended or adjusted under 35 U.S.C. 154(b) by 275 days.

(21) Appl. No.: 13/311,090

(22) Filed: Dec. 5, 2011

(65) Prior Publication Data

US 2012/0086245 A1 Apr. 12, 2012

Related U.S. Application Data

(63) Continuation-in-part of application No. 11/951,143, filed on Dec. 5, 2007, now abandoned.

(60) Provisional application No. 60/868,692, filed on Dec. 5, 2006.

(51) Int. Cl.
*A47C 7/62* (2006.01)
*B60N 2/44* (2006.01)

(52) U.S. Cl.
USPC .................................. 297/188.18; 297/188.14

(58) Field of Classification Search
USPC .......... 297/188.14, 188.18, 145, 160, 411.23; D7/620
See application file for complete search history.

(56) References Cited

U.S. PATENT DOCUMENTS

| | | | |
|---|---|---|---|
| 3,532,318 A * | 10/1970 | Lloyd | 248/311.2 |
| 3,690,724 A | 9/1972 | Douglas | |
| 4,262,962 A | 4/1981 | Yust | |
| D289,961 S * | 5/1987 | Hentrich | D7/620 |
| 4,728,147 A | 3/1988 | Dutton | |
| 5,106,046 A * | 4/1992 | Rowles et al. | 248/311.2 |
| 5,143,337 A * | 9/1992 | Tomayko et al. | 248/311.2 |
| 5,232,262 A | 8/1993 | Tseng | |
| 5,238,212 A | 8/1993 | Dechellis | |
| 5,302,000 A | 4/1994 | Ayotte | |
| 5,395,085 A | 3/1995 | Mann | |
| 5,474,272 A | 12/1995 | Thompson et al. | |
| 5,533,782 A | 7/1996 | Goldman | |
| 5,667,180 A * | 9/1997 | Duckworth | 248/311.2 |
| 5,695,162 A | 12/1997 | DiCastro | |
| 6,264,272 B1 * | 7/2001 | Jones et al. | 297/173 |
| 6,352,303 B1 | 3/2002 | Hope | |
| 6,478,371 B1 | 11/2002 | Clarke | |
| 6,578,914 B2 * | 6/2003 | Artsvelyan | 297/219.1 |
| 7,216,930 B2 * | 5/2007 | Steenson | 297/161 |
| 7,284,737 B2 * | 10/2007 | Kane | 248/311.2 |
| 7,360,829 B2 * | 4/2008 | Bufkin | 297/162 |
| 7,367,618 B2 * | 5/2008 | Rossini | 297/188.18 |
| 7,431,396 B1 * | 10/2008 | Dasso | 297/227 |

* cited by examiner

*Primary Examiner* — David R Dunn
*Assistant Examiner* — Tania Abraham
(74) *Attorney, Agent, or Firm* — Wood, Herron & Evans, LLP (57) ABSTRACT

Disclosed herein is a cup-holding device configured to be retrofitted to an seat arm or other horizontal support structure. The cup-holding device has a basket in a seat-mounting portion wherein there is sufficient rigidity of the structure to hold a cup or similar small item(s).

8 Claims, 15 Drawing Sheets

CUP HOLDER

RELATED APPLICATIONS

This application is a Continuation in Part and claims priority benefit of U.S. Ser. No. 11/951,143, filed Dec. 5, 2007, now abandoned which in turn claimed priority benefit of U.S. Provisional Ser. No. 60/868,692, filed Dec. 5, 2006, and both are incorporated herein by reference.

BACKGROUND OF THE DISCLOSURE

The invention relates to an apparatus removably attached to the arm of a seat for the purpose of holding beverages, food, and similar concessions.

The invention relates to the art of cup holders that generally are attached to seats for the purpose of holding beverages, food, and similar concessions.

Anyone who has gone to a sporting event or to a stadium has noticed that the purchase and consumption of beverages and other articles is necessary given the extended time that is often seen at a sporting event such as football. Oftentimes it becomes necessary to set one item down when both hands are needed or when moving from one place to another. Some stadium seating has been adapted to have built-in beverage containers; however, older stadiums may need to be fitted with such containers to be practical and was not configured originally with such a means for holding beverages and the like, or possibly, during their use, such objects have become nonfunctional or broken. Thus the need for a retrofit of set beverage holders and article holders has been considered and reviewed in several different patents, including Decastro U.S. Pat. No. 5,695,162 and Clark U.S. Pat. No. 6,478,371 Yust U.S. Pat. No. 4,262,962. However, these inventions fall far short of the need either for permanent retrofitting required to install said devices, or in their limited applications.

Therefore, it can be appreciated that the various references above disclose a broad concept of a stadium-like seating device with an armrest cup holder retrofitted thereto.

SUMMARY OF THE DISCLOSURE

The disclosed embodiment is a vessel holder to be used in seating where such holders have not already been adapted or are not sufficient for use. The disclosure is useful for holding drinks, hot dogs, peanuts as well as other relatively small items.

Disclosed herein are several embodiments of a vessel holder which can be removably coupled to a seat having arms. As disclosed, a surface of an arm of the seat defines a front end, a top surface, and a bottom surface.

The vessel holder itself in one form comprises: a basket, a seat-mounting portion comprising a first side and a second side. The seat-mounting portion may be coupled to the basket support ring and may be configured to extend beyond the front end of the arm of the seat. The seat-mounting portion may be configured to be removably attached to the arm of the seat. A retaining structure is also disclosed, coupled to the seat-mounting portion coupled to the first side of the seat-mounting portion and configured to extend under the bottom surface of the arm of the seat and couple to the second side of the seat-mounting portion. In one form, the basket, and seat-mounting portion are cast of a single mold.

The basket further may further comprise a surface defining an opening adaptively configured to receive a handle of the vessel.

The basket may be a frusto-conical surface and may comprise: an upper portion having an upper inner surface; a lower portion having a lower inner surface; and the lower inner surface may be of smaller diameter than the upper inner surface.

In this embodiment, the basket may be a frusto-conical surface enabling the exterior of one basket to fit partially largely within the interior of another basket.

The seat having arms may be a portion of a wheeled apparatus such as a mobility scooter, wheelchair, walker or similar apparatus.

The vessel holder may further comprise a surface defining a first opening disposed in the first side of the seat-mounting portion, and a surface defining a second opening disposed in the second side of the seat-mounting portion. A first strap may be employed, coupled to the surface defining a first opening. A second strap may also be employed, coupled to the surface defining a second opening, and the first strap may be adaptively configured to couple to the second strap in such a way as to secure the vessel holder to the arm of the seat. The first strap and the second strap may comprise a unitary structure.

The first strap may be adaptively configured to couple to the second strap to secure the vessel holder to the arm of the seat by way of a hook and loop apparatus.

The vessel holder as disclosed may further comprise a recess to partially retain at least one of the first or second straps.

The vessel holder may be arranged wherein the basket is a frusto-conical surface comprises: an upper portion having an upper inner surface; a lower portion having a lower inner surface; and the lower inner surface is of smaller diameter than the upper inner surface. This arrangement results in a "lip" or shoulder at the intersection of the upper inner surface and the lower inner surface for supporting larger vessels such as large glasses, bottles, etc.

DESCRIPTION OF THE PREFERRED EMBODIMENTS

Before going into a more detailed discussion, an axes system 10 is utilized to help describe the drawings herein. In general the axis indicated at 12 indicates a longitudinal direction and the arrow points toward the basket. The axis indicated at 18 is a vertical axis and indicates a vertical direction, axes 16 and 14 indicate transverse directions where 16 is herein referred to as the leftward direction and 14 indicates a rightward direction. The axes described here are for general reference purposes and generally denote directions for ease of description and general orientation of components described herein and are not intended to limit the disclosure to a particular orientation.

In general, the apparatus 21, in one form, is comprised of a seat-mounting portion 22, an intermediate portion 28, and vessel holder portion 30. As further shown in FIG. 1, the seat-mounting portion 22 has an upper surface 52 including surfaces defining voids 62 and may include a chamfered edge 54. The term seat defined herein refers to stadium seating, chairs, lounges, stools, wheelchairs, mobility scooters, power chairs, office chairs, or any other object to which the apparatus may be attached.

Figure 2:
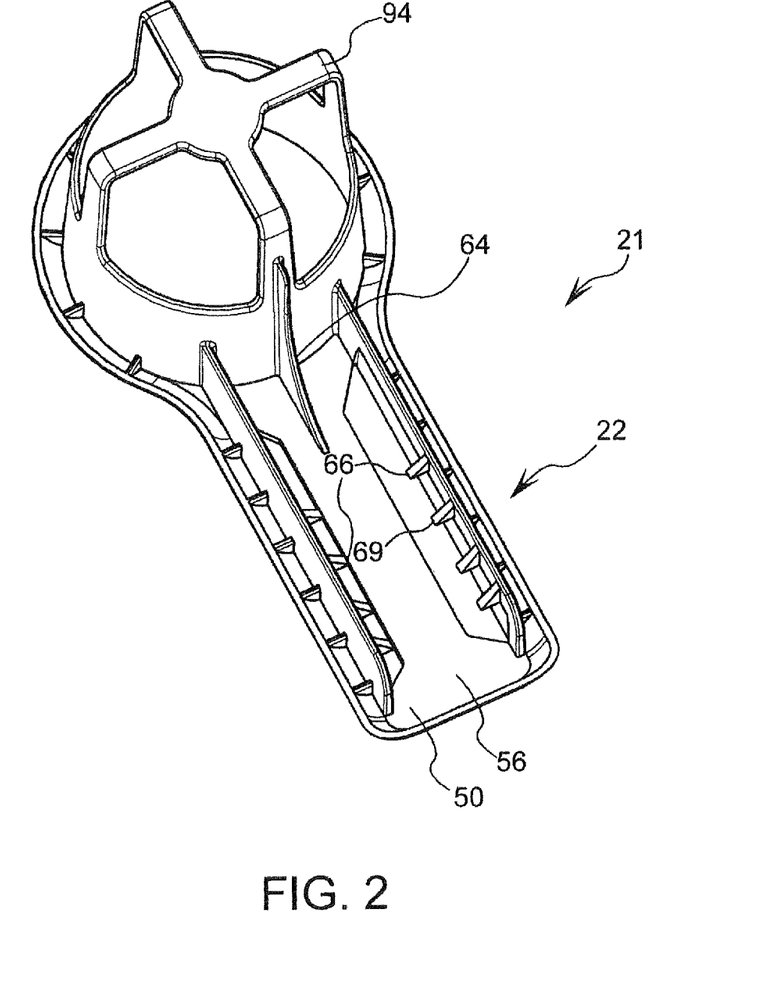
FIG. 2 is a perspective bottom view of the embodiment of the FIG. 1.

FIG. 2 shows the underside of the apparatus 21 in one form and shows the seat mounting portion 22 which includes injection molding gussets. These gussets can be used in forming the apparatus through the process of injection molding. This process may utilize seat mounting tabs 66 which will be described in detail later, and the second surface of the seat mounting portion 56 extending from the lower surface 50 of the apparatus 21. Further shown is a rigid basket support 64 which keeps the apparatus from bending when heavy objects are placed in the basket 94.

Figure 3:
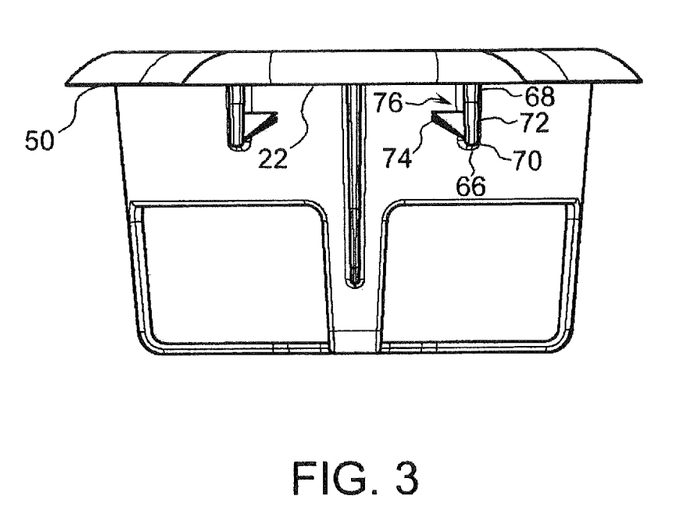
FIG. 3 is an end view of the extension tab 66.
Figure 10:
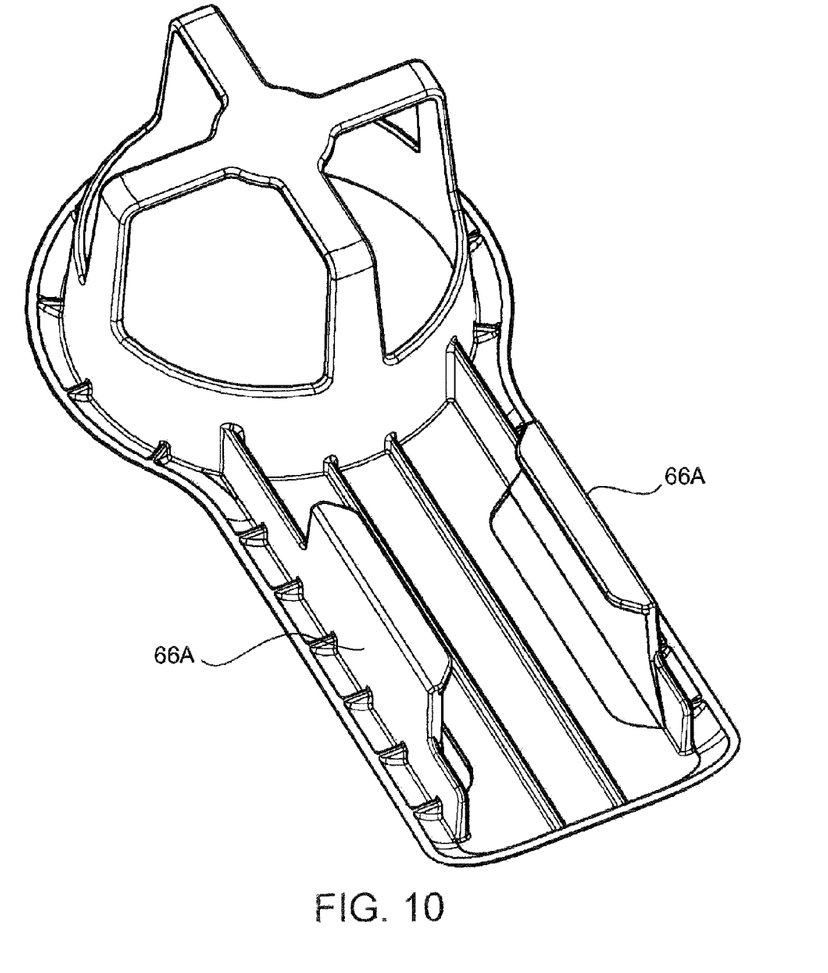
FIG. 10 is a perspective view of the underside of another embodiment of the disclosure.

Now referring to FIG. 3, the seat-mounting tabs 66 are shown in detail. These tabs 66 consist of several portions; the first end 68 is coupled to the lower surface 50 of the seat-mounting portion 22 and extends vertically downward therefrom. A vertical portion 72 of seat-mounting tab 66 extends between the first end 68 to the second end 70 of tab 66. Extending horizontally from the second end of tab 66 is a wedge-shaped portion 74 of tab 66 extending inwardly from the vertical portion 72. The wedged-shaped portion 74 of tab 66 includes an upper surface 76. The seat-mounting tabs 66 can be provided in pairs configured to actively couple the apparatus 21 to the upper surface of the arm of a chair, stadium seat, or similar structure. As shown in the embodiment of FIG. 2, four pairs of these seat-mounting tabs 66 are provided, generally directly below the surface defining injection access voids 62 for ease in production. FIG. 10 shows an alternate embodiment of these tabs (66a).

Figure 4:
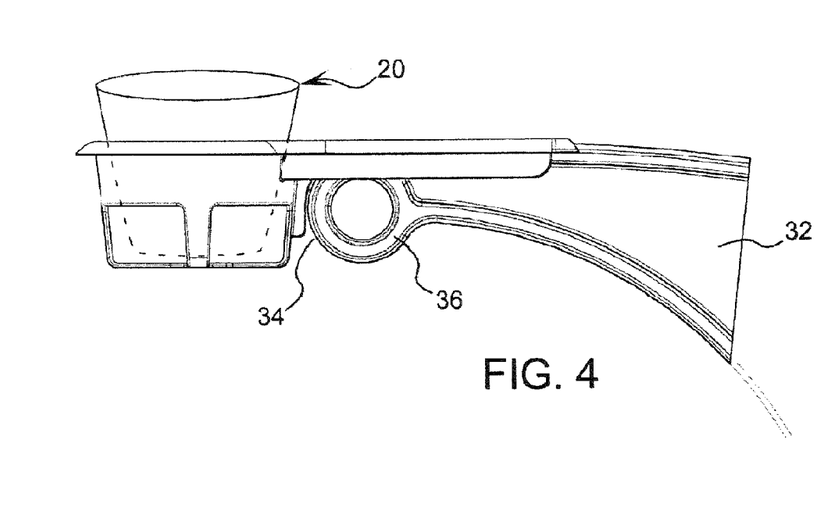
FIG. 4 is a side view of a second embodiment engaged in an upper surface of the seat arm.
Figure 5:
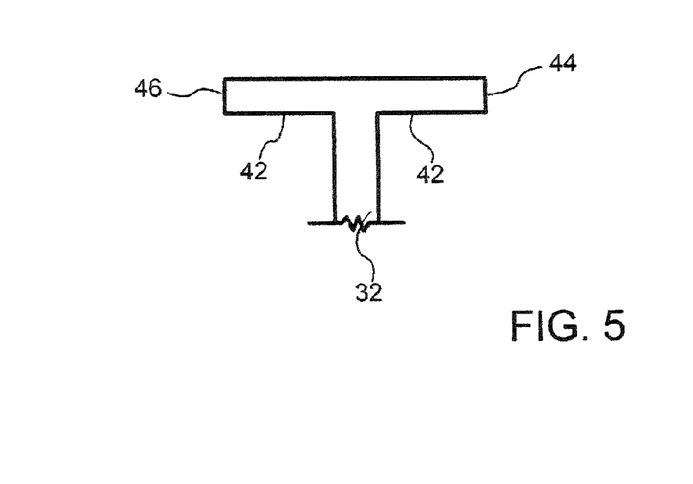
FIG. 5 is a cross-section of the seat arm 32.
Figure 8:
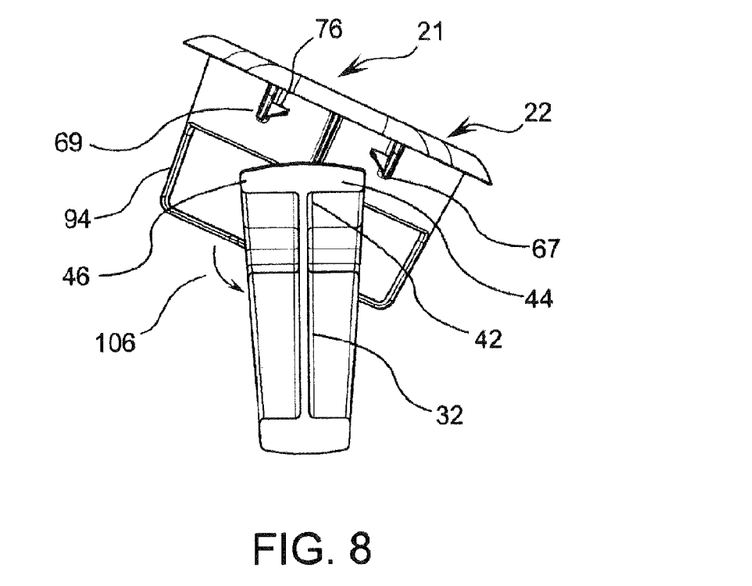
FIG. 8 is an end view of the embodiment of FIG. 4 being attached to the seat arm.

One method for attachment of the apparatus to the arm of a seat in one form can be easily understood by referring to FIG. 8, and include the steps of generally aligning the seat-mounting portion 22 to the upper surface of the arm of a seat such that the basket 94 of the vessel holder or apparatus 21 is longitudinally forward of the front surface of the seat as shown in FIG. 4, the front surface generally being the front 34 of the seat arm 32. Looking at FIG. 8, the first set 67 of the seat-mounting tabs 66 is positioned underneath the extension 44 of the arm 32 of the seat, as shown in FIG. 8. The seat-mounting portion 22 is rotated 106 to engage the second set 69 of seat-mounting tabs 66 underneath the second extension 46 of the arm 32 of the seat, and this engagement expands the tabs 66 away from each other as they temporarily deform outwardly. Once beyond the extension members of the arm of the seat, the tabs re-position themselves underneath the extension of the arm of the seat such that the upper surface 76 of the wedge 74 is in contact with the underside of the upper surface of the arm 42 of the seat.

Figure 6:
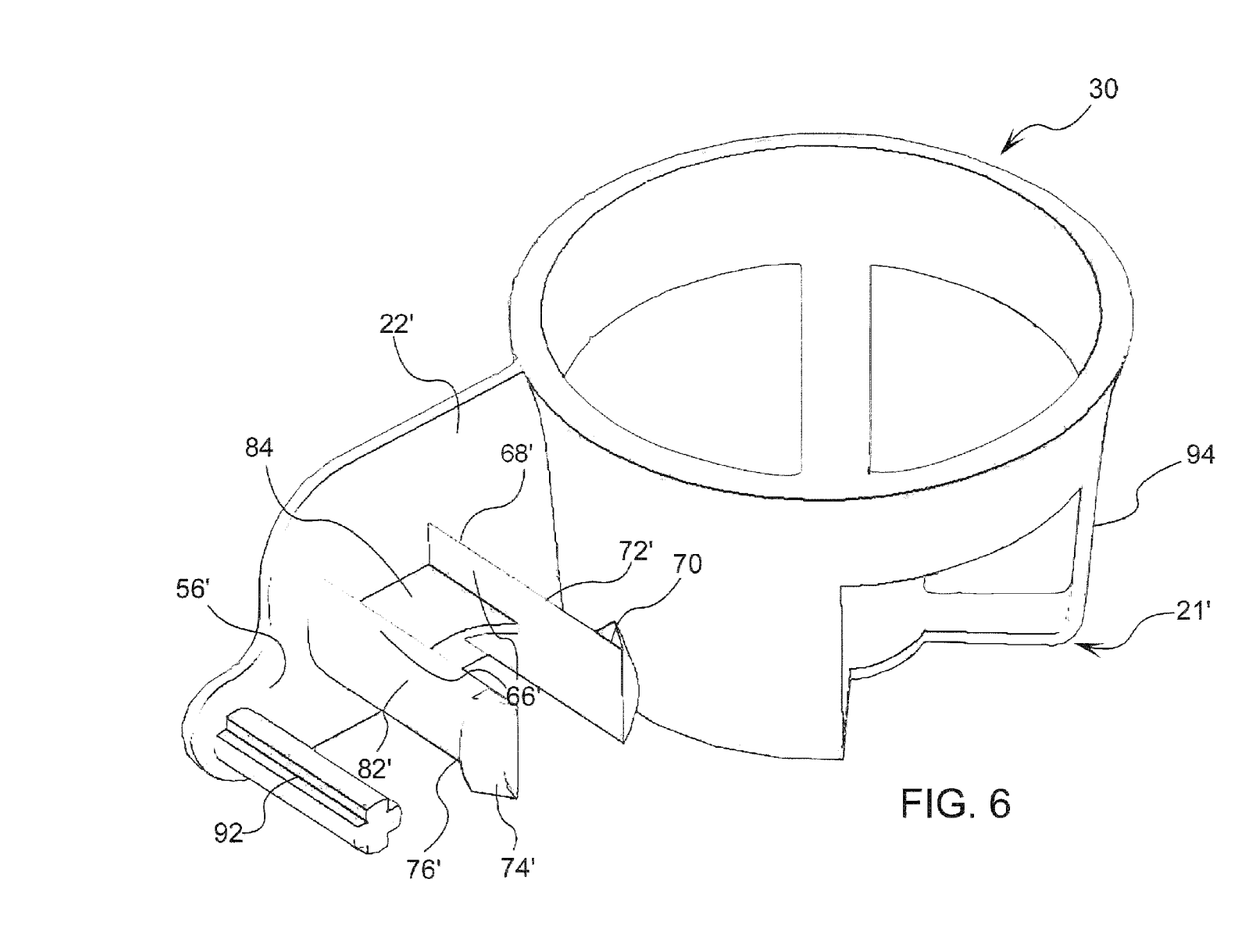
FIG. 6 is a perspective view of the embodiment of FIG. 4.
Figure 7:
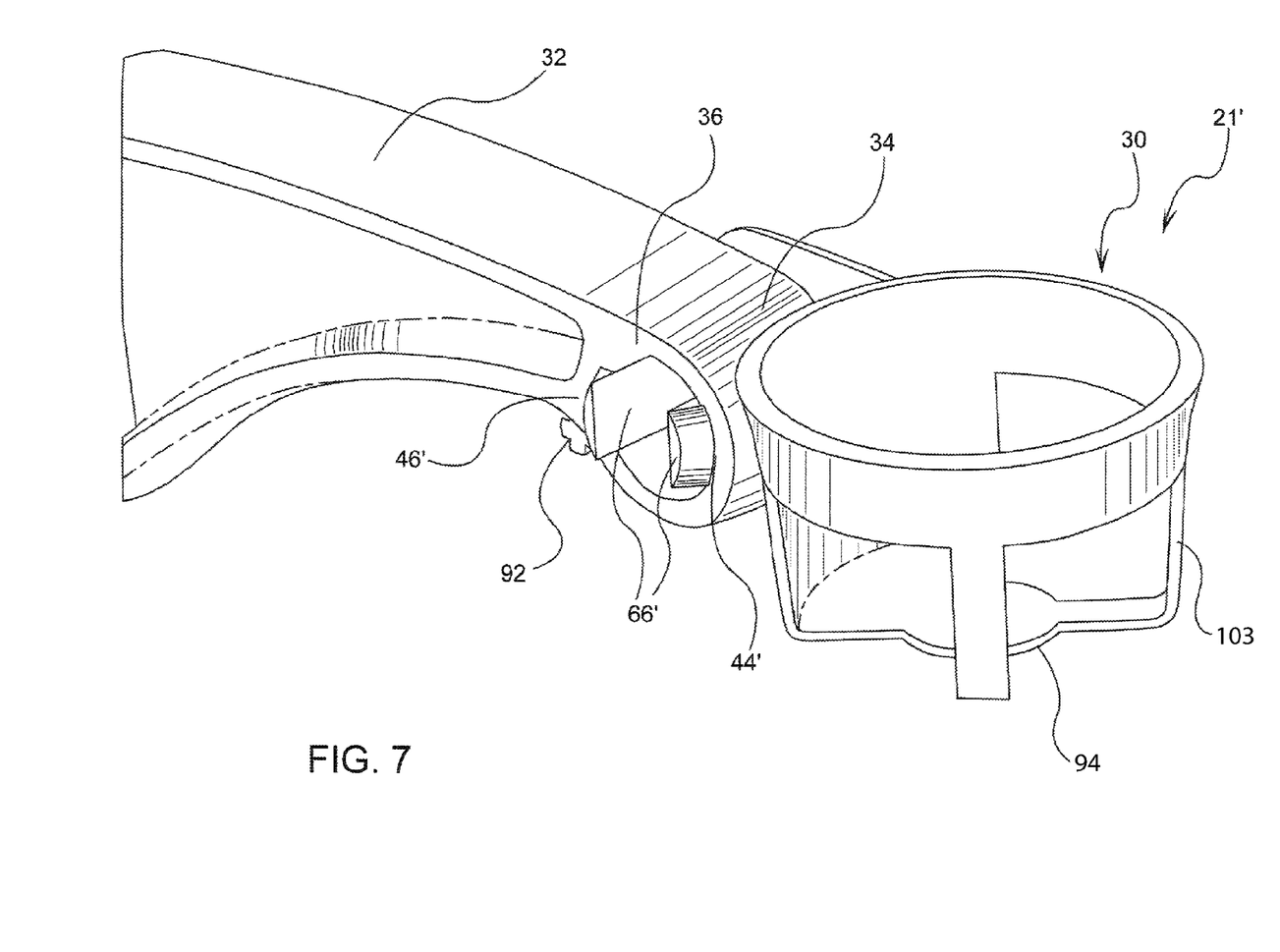
FIG. 7 is a perspective view of the embodiment of FIG. 4 engaged in a seat arm.

In FIG. 6, a second embodiment is shown wherein the seat-mounting portion 22' is configured to engage the side of the arm 32 of a seat (see FIG. 7). This embodiment consists of seat-mounting tabs 66' extending from an inward surface 56' of seat-mounting portion 22' wherein a plurality of seat-mounting tabs 66' extend from the inward surface 56' of the seat-mounting portion 22'. The seat-mounting tabs 66' have a first end 68' coupled to the inward surface 56' of seat-mounting portion 22' and extending horizontally therefrom. A horizontal portion 72' connects the first end 68' with the second end 70' of seat-mounting tabs 66. The second end 70' of seat-mounting tab 66' further includes a wedge-shaped portion 74' and also forms a vertical surface 76'. To strengthen the seat-mounting tabs 66', a mounting tab support gusset 84 may be included coupled to the plurality of the seat-mounting tabs 66', and optionally coupled to the seat-mounting portion 22', adding rigidity to the seat-mounting tab 66'. Further included in this embodiment is an optional rotation-resisting member 92 coupled to the inward surface 56' of the seat-mounting portion 22'. The moment-resisting member 92 is shown in FIG. 7 resisting the moment of force around the pivot point formed by the seat mounting tabs 66' within the ring defining a void 36. The front portion 34 of the seat arm 32 includes a ring defining a void 36. This ring further includes a first extension 44' and a second extension 46' to operatively configure the second embodiment to the arm 32 of the seat. To use the apparatus, insert the seat mounting tab 66' into the ring defining a void, press the tabs into the ring defining a void, and the seat mounting tab 66' will compress (deform) inwardly to fit within the ring 36, once the wedge-shaped portion 74 (specifically the vertical surface 76' of the wedge-shaped portion 74') is far enough into the ring defining a void 36. The seat-mounting tabs will expand outwardly and the wedge-shaped portion will resist removal of the apparatus 21'.

The rotation resisting member 92 is shown in this environment as resting below of the arm of the seat and resisting the force tangential to the rotation axis exerted by any weight of the basket 94 or the vessel 20 and its contents. To increase the strength of the apparatus, one surface 82' of the tabs could be formed to conform to the inner surface of the ring 36. The moment resisting member 92 may have an X-shaped cross section for increased stability.

Figures 11, 12:
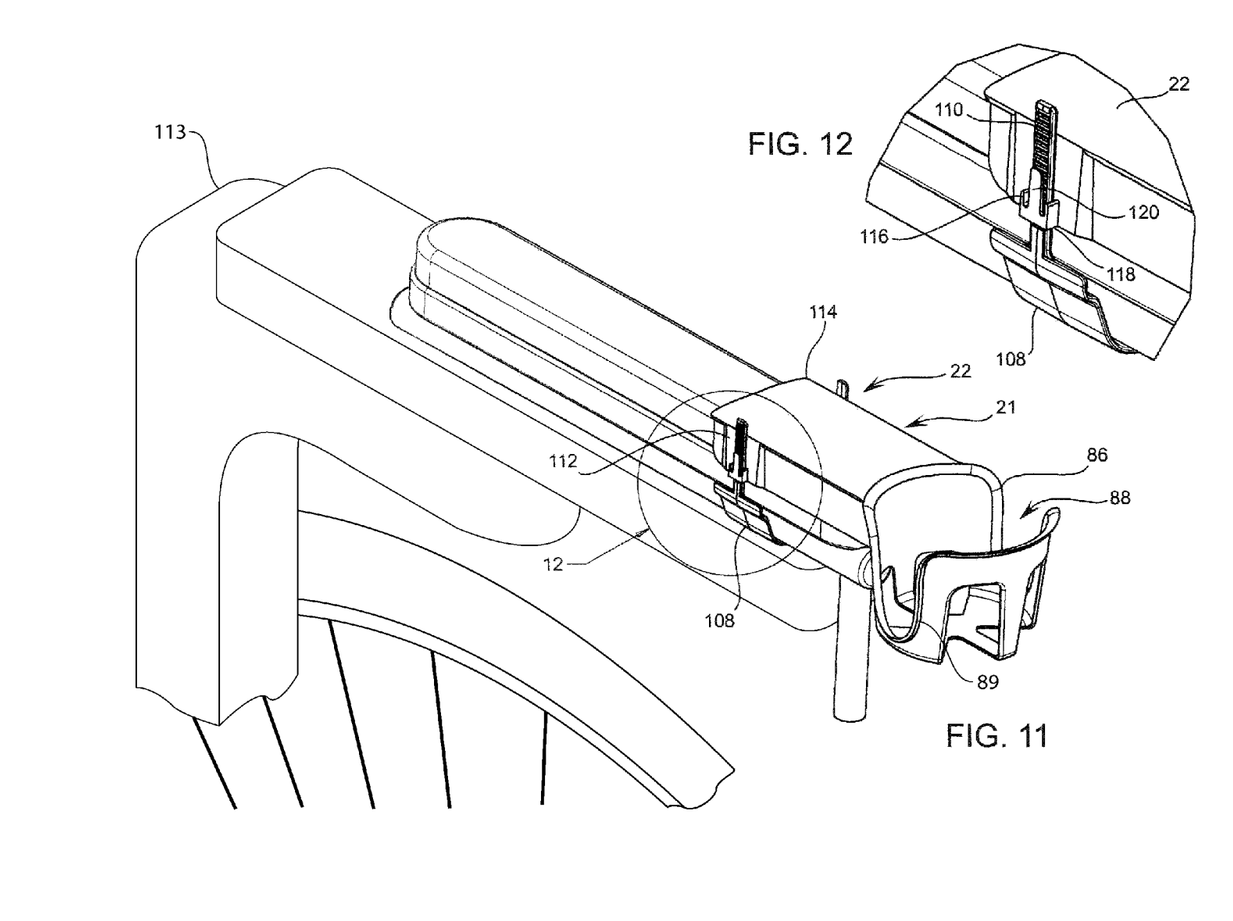
FIG. 11 is a perspective view of another embodiment of the disclosure showing one embodiment of an attachment mechanism.
FIG. 12 is a detailed view of the embodiment of FIG. 11.
Figures 13, 14:
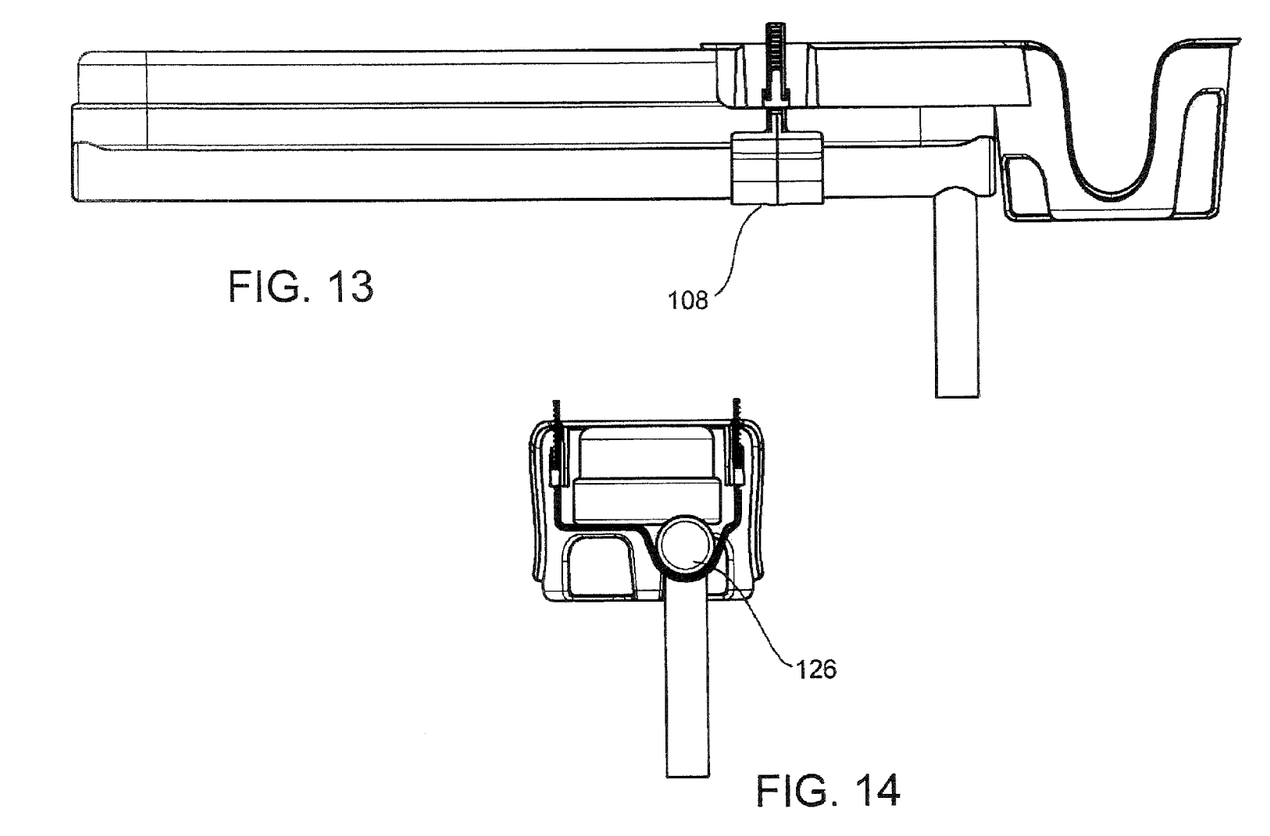
FIG. 13 is a side view of the embodiment of FIG. 11.
FIG. 14 is an end view of the embodiment of the disclosures shown in FIG. 11.

In one form shown in FIG. 11 a surface 86 is disclosed defining an opening 88. This opening 88 is useful as many vessels such as coffee cups have handles and said handles in many embodiments will prohibit the vessel from being completely retained by the basket 94 and other embodiments such as the embodiment of FIG. 1. The opening 88 is surrounded by an outwardly-directed projecting lip 89 formed in the basket support ring and in the basket, as shown in FIG. 11. The lip 89 strengthens the vessel holder 21 from stress or buckling failure at the opening 88.

FIG. 11 also shows another embodiment of the attachment mechanism. In this embodiment, the apparatus 21 comprises a seat-mounting portion 22. In this embodiment a strap 108 is employed, which couples to a first side 112 of the seat-mounting portion 22 optionally by way of a ratcheting portion, as detailed in FIG. 12. The strap 108 also couples to the seat-mounting portion 22 at the second side 114. As shown in FIG. 12, the ratcheting portion comprises a ribbed portion 110, which is a strap-like extrusion having a plurality of ribs on its surface. FIG. 11 also illustrates a wheeled apparatus 113 (e.g., a wheelchair) that the apparatus 21 may be coupled to as described briefly below in the particular embodiment of FIGS. 15 and 16.

The ribbed portion 110 of the strap 108 is configured to fit within an opening 118 of a receiver 116. The receiver 116 in one form has a release mechanism 120. The release mechanism 120 may be configured such that when it is pulled away from the ribbed portion 110, the ribbed portion 110 is released and the apparatus 21 can be removed from the arm of the seat without damage to the seat or holder. This attachment structure can be repeated on the second side 114 of the seat-mounting portion 22.

Alternatively, the mechanism can be inverted such that the receiver 116 is disposed upon the strap 108 and the ribbed portion 110 is disposed upon or formed with the seat-mounting portion 22.

Figures 15, 16:
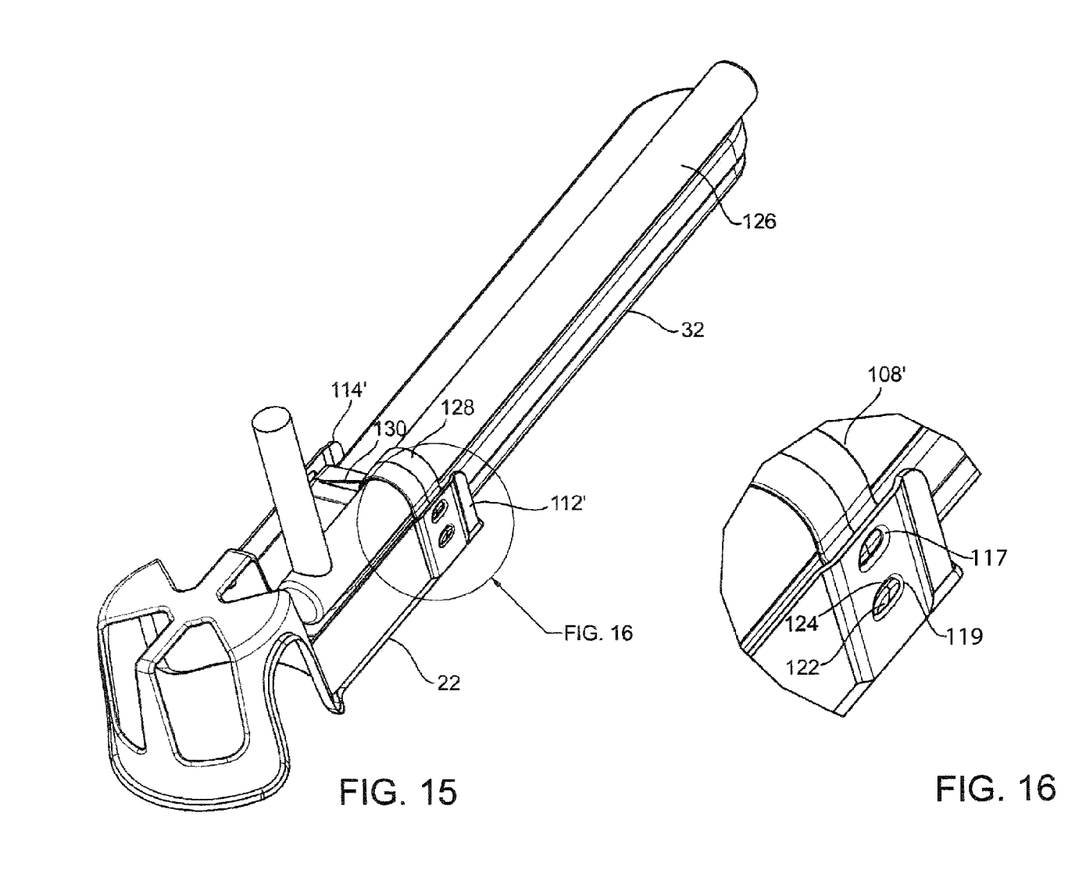
FIG. 15 is an orthogonal view of another embodiment of the disclosure.
FIG. 16 is a detailed view of a portion of the embodiment shown in FIG. 15.

FIGS. 15-16 disclose another embodiment of the disclosure, in one form. In one embodiment, the strap 108' has a plurality of snap in tabs 117 disposed thereon. The first side 112' and second side 114' of the seat mounting portion 22 have a plurality of openings 119 disposed thereon. These openings 119 are configured to retain the snap in tabs 117 when the seat mounting portion 22 is coupled to the arm 32 of the seat. The snap in tabs 117 may be formed of a wedge-shaped protrusion which has a ramp surface 122 and a retaining surface 124. These operate similarly to the seat mounting tab 66' of FIG. 6. This embodiment is especially useful to attach to the arms 32 of wheeled apparatus such as wheelchairs which oftentimes have a tubular structure on 126. The tubular structure 126 is often the structural portion of the chair and the arm 32 is disposed thereon. To enable attachment to such arms, the strap 108' may be provided with a bar loop 128 as shown in FIG. 15. A support gusset 130 may be formed upon the surface of the strap 108' to further structurally enhance the apparatus. To utilize this embodiment of the disclosure, the seat mounting portion 22 is placed upon the arm 32 of the chair and the strap 108' is positioned below the tube structure 126 and pressed upwardly into place such that the snap in tabs 117 fit within the openings 119 and snap fit into place. Optionally a plurality of openings 119 may be provided to enable the apparatus 21 to be attached to chairs having arms 32 of varying thicknesses.

Figure 17:
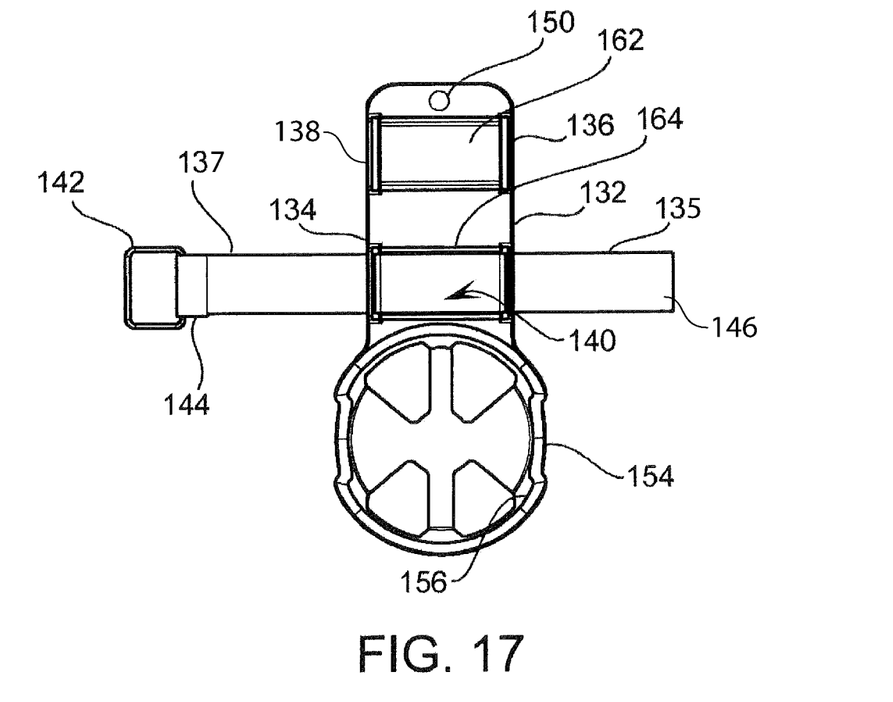
FIG. 17 is a plan view of another embodiment of the disclosure showing another embodiment of an attachment mechanism.
Figure 18:
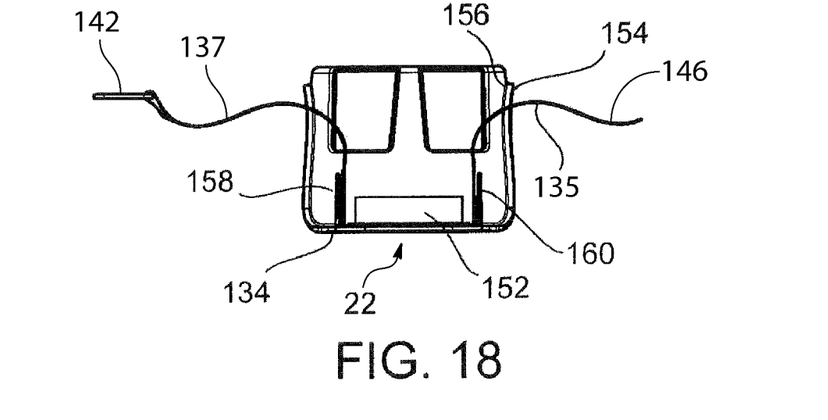
FIG. 18 is an end view of the embodiment shown in FIG. 17.

One additional embodiment of the disclosure is shown in FIGS. 17 and 18 wherein the seat mounting portion 22 comprises a plurality of openings 132 and 134. Additional openings 136 and 138 may also be provided enabling a wide variety of attachments, as will be understood by repeating the attachment method herein disclosed. In this embodiment a first strap 135 is passed through the opening 132 and may be partially set within a recess 164. A similar recess 364 can be seen in FIG. 19. A second strap 137 may also be passed through the opening 134 and may be partially retained by a recess 162. A similar recess 362 can be seen in FIG. 19. These straps 135, 137 may be coupled to the seat mounting portion 22. The second strap 137 may comprise an eye portion 142. The eye portion 142 is configured to accept a first strap 135. The eye 142 may be stitched 144 to the second strap 137. In one form to utilize this embodiment, the first strap 135 comprises a first surface 146 and a second surface 148. The first strap 135 is passed through the eye 142 and reversed back upon itself wherein the first surface 146 comes in contact with the second surface 148. An adhering apparatus may be disposed upon the first and second surface of the first strap 135. For example, a hook and loop attachment system therein may be used wherein a hook surface is disposed upon the first surface 146, and a loop surface is disposed upon the second surface 148, wherein the two surfaces will adhere to one another when they come in contact with each other, and can be readily detached for removal of the apparatus 21. Alternatively, the first strap 135 may have a first part of the hook and loop structure, and the second strap 137 may have the second part of the hook and loop structure, wherein the first strap 135 will adhere to the second strap 137 and similarly couple the device to the arm of the chair. A second set of openings 136 and 138 are also provided in one form so that if a structural member of the chair should prohibit the attachment through the first openings 132 and 134, the second set of openings 136 and 138 can be alternatively used. It is also conceived for increased structural support that an additional strap would be provided in both positions.

A plurality of extending members 158 and 160 may be provided which enhance the structural rigidity of the apparatus, and also restrict side to side and rotational movement of the apparatus in relation to the arm of the chair.

Further, a foam-like member 152 may be included, having a lower durometer rating (between 20 and 50 durometer rating), which provides a cushioning elastic effect having a lower Young's modulus of elasticity to have this portion in compression when applied so as to tighten the fit between the unit and the armchair member. The coefficient of friction between the device and the contact surface of the seat arm in one embodiment is desired to be at least greater than 0.4 to help keep the unit on the armchair. A surface defining hole 150 may be provided. This hole may be configured to hang the unit for display or when not in use. Further, when hanging in a vertical orientation, the nesting effect of the units can be employed where the outer surface 154 of the cup-holding region fits within the inner surface 156 of an immediately adjacent rearward member cup-holding member when, for example, stacked on a peg for sales or storage purposes.

Figure 19:
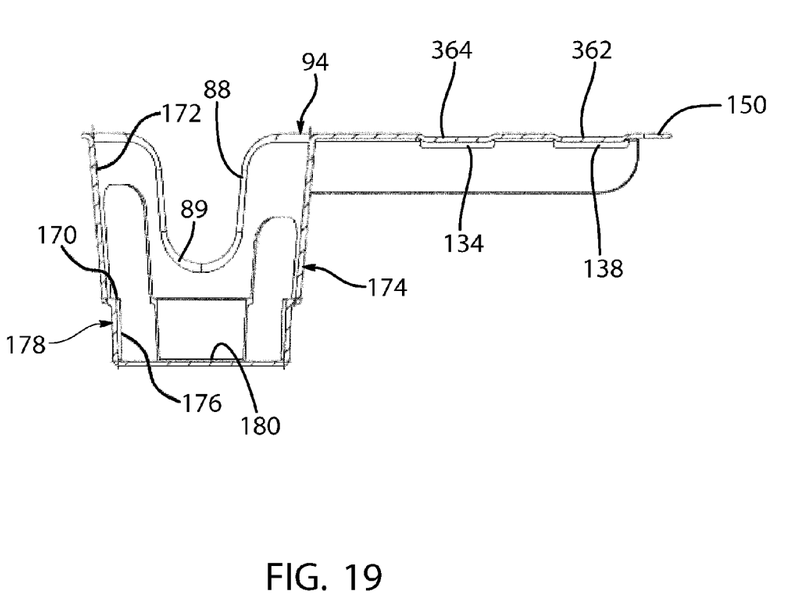
FIG. 19 is an isometric view of another embodiment of the disclosure.
Figure 20:
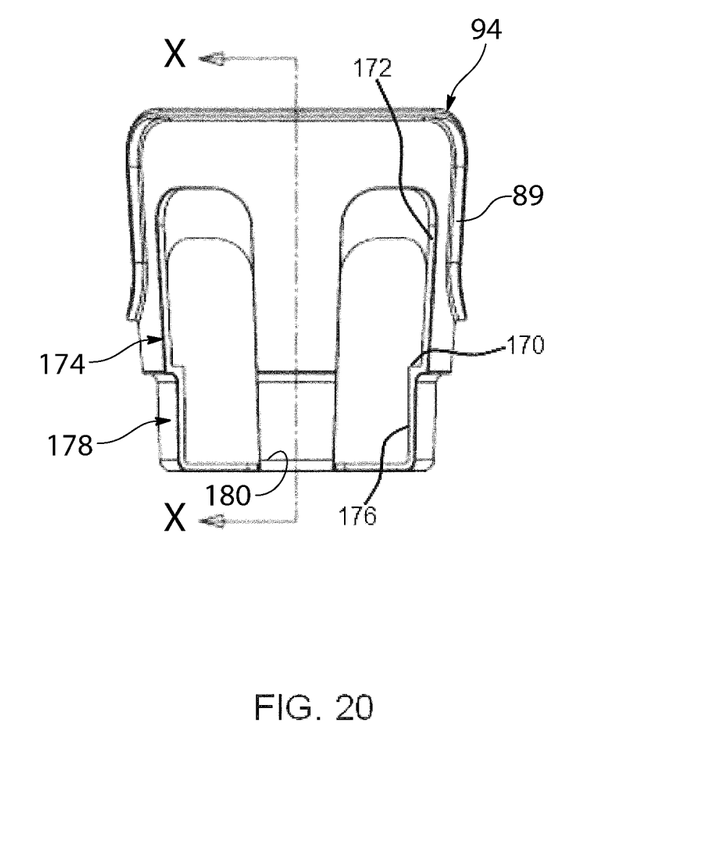
FIG. 20 is an end view of the embodiment of FIG. 19.
Figure 21:
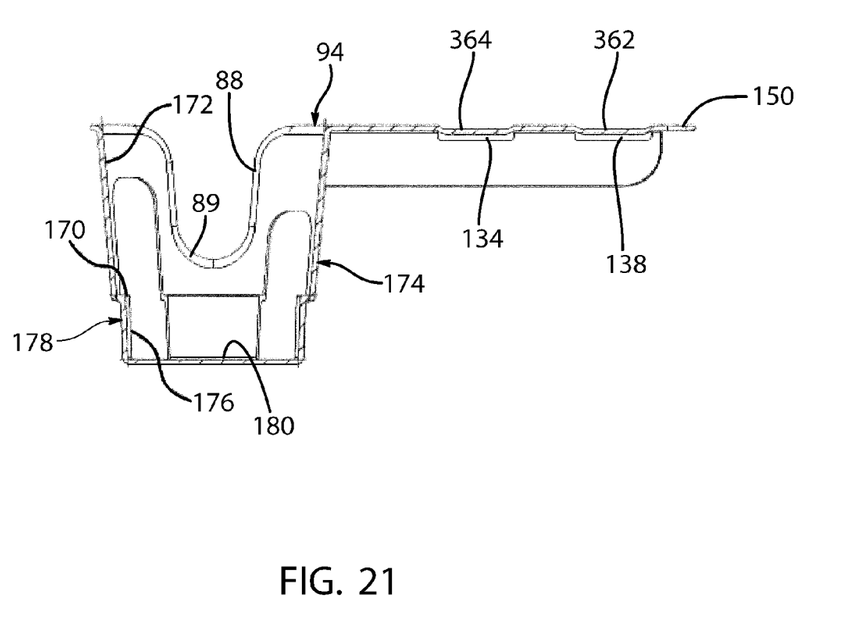
FIG. 21 is a side cutaway view of the embodiment of FIG. 20 taken along line X-X in FIG. 20.

The embodiment shown in FIGS. 19-21 utilizes the same attachment mechanism as shown in the embodiment of FIGS. 17-18. This embodiment utilizes the handle opening 88 similar to that shown in FIGS. 11-16 and also incorporates a specific basket arrangement to hold vessels with or without handles and of varying sizes. Vessels having larger bases may sit upon the lip 170 and be held from tipping by way of the interior surface 172 of the upper portion 174 of the basket 94 in this form. Vessels having a smaller base, or a stepped base made for larger vessels to fit into older, "pop can" size holders, may extend to the base 180 of the basket and be supported there. In this arrangement, the smaller interior surface 176 of the lower portion 178 may support the vessel from tipping.

Further, the unit can have a display portion in the upper surfaces to possibly display team logos or the like. This can be attached after the plastic injection molding process by way of an adhesive-type sticker or the like. Or it could be a part of the molding process wherein, for example, an insert as a part of the mold to provide a custom logo embedded on the upper surface or any available surface.

Figure 1:
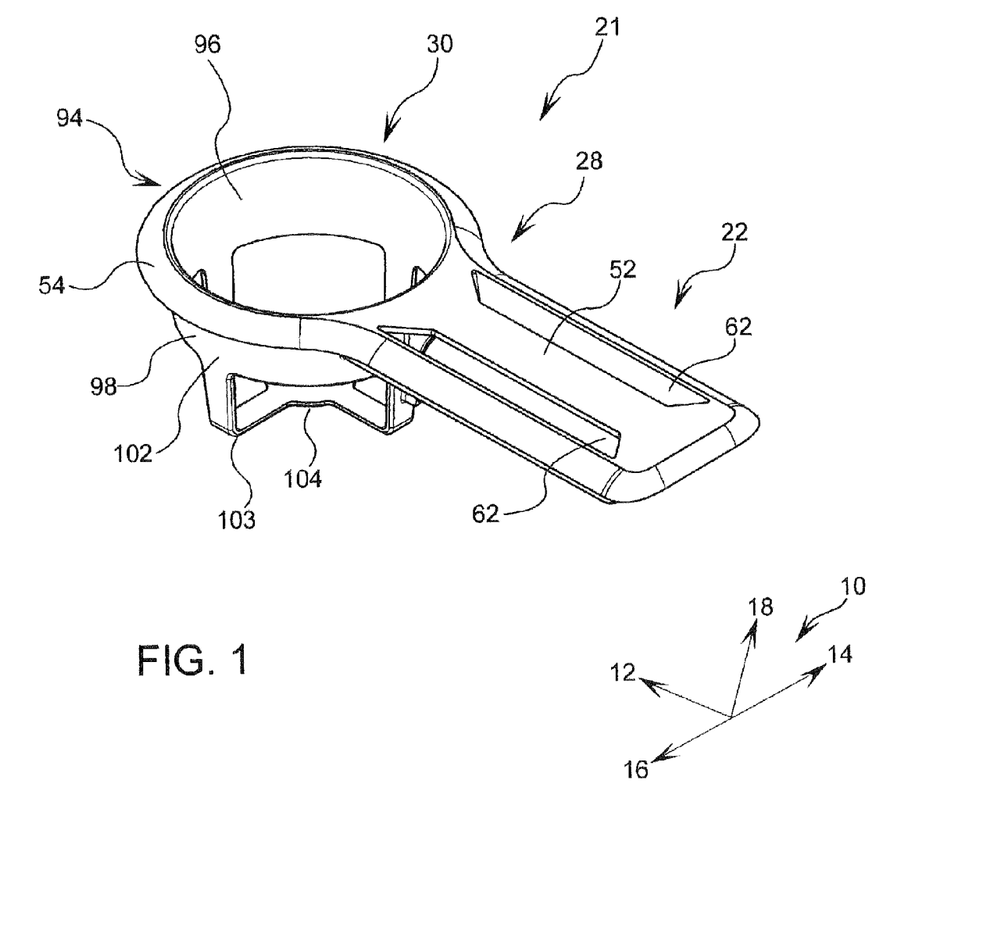
FIG. 1 is a perspective top view of one embodiment of the disclosure and of the axis system.

In one form shown in FIG. 1, the disclosure involves a plurality of basket support members 103 extending vertically from the basket support ring 102 and connecting at a basket center 104. In FIG. 1 there is a plurality of four support members 103, whereas in FIG. 7 three support members 103 form the basket 94.

Figure 9:
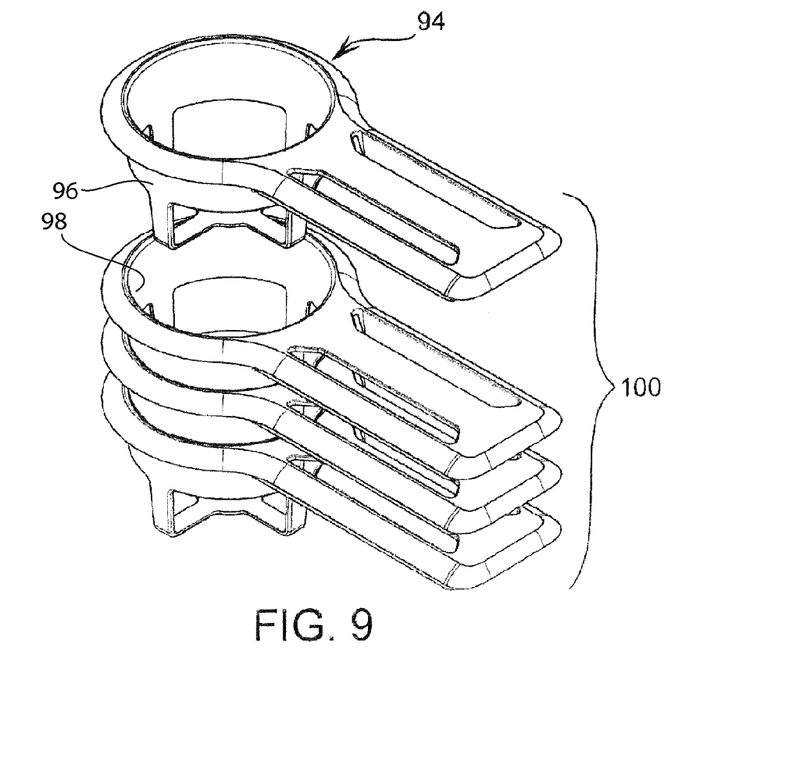
FIG. 9 is a view of a plurality of the embodiments of FIG. 4 stacking therewith.

As with any mass produced article, space is always a factor within the cost of sales. As shown in FIG. 9, the apparatus 21 can be configured in such a way that the basket 94 is a frusto-conical surface wherein the exterior 98 of a basket 94 fits largely within the interior 96 of another basket 94 and the apparatus 21 can be effectively stacked 100 as shown in FIG. 9.

Considering the current state of our landfills and the problems that many plastics cause to long term disposal issues, an apparatus produced from a biodegradable medium may be advantageous.

While the present invention is illustrated by description of several embodiments and while the illustrative embodiments are described in detail, it is not the intention of the applicant to restrict or in any way limit the scope of the appended claims to such detail. Additional advantages and modifications within the scope of the appended claims will be readily apparent to those sufficient in the art. The invention in its broader aspects is therefore not limited to the specific details, representative apparatus, and methods, and illustrative examples shown and described. Accordingly, departures may be made from such details without departing from the spirit or scope of the applicant's general concept.

We claim:

1. A vessel holder removably coupled to a seat having arms, wherein a surface of an arm of the seat includes a front end, a top surface, and a bottom surface, and the vessel holder comprises:
    a rigid basket, the basket including an upper portion and a lower portion extending downwardly from the upper portion, the upper portion and the lower portion defining an interior surface configured to support a vessel placed in the basket, the lower portion having a smaller diameter at the interior surface than the upper portion such that a lip is formed at an intersection of the upper and lower portions along the interior surface, the basket defining a continuous annular periphery at a top of the upper portion that is interrupted only by two basket openings formed on opposite sides of the basket, each of the two basket openings extending downwardly from the top of the upper portion so as to be configured to receive a handle of the vessel placed in the basket, and each of the two basket openings being surrounded by an outwardly projecting lip formed on the basket,
    a seat-mounting portion comprising a first side and a second side each extending generally rearwardly from one of the opposite sides of the basket, the first side including a first surface defining a first opening and the second side including a second surface defining a second opening, the seat-mounting portion coupled to the upper portion of the basket and configured to extend beyond the front end of the arm of the seat, the seat-mounting portion configured to be removably attached to the arm of the seat, and
    a retaining structure including a first strap removably coupled to the first side of the seat-mounting portion so as to extend through the first opening, and a second strap removably coupled to the second side of the seat-mounting portion so as to extend through the second opening, the first and second straps being configured to extend under the bottom surface of the arm of the seat and couple to one another to secure the vessel holder to the arm of the seat,
    wherein the basket and seat-mounting portion are cast of a single mold, and
    wherein the basket further includes an outer surface opposite the interior surface, the outer and interior surfaces being sized such that when first and second vessel holders are stacked, the outer surface of the basket of the first vessel holder nests within the interior surface of the basket of the second vessel holder.

2. The vessel holder of claim 1, wherein the basket defines a frusto-conical surface at the interior surface.

3. The vessel holder of claim 1, wherein the seat having arms is a portion of a wheeled apparatus.

4. The vessel holder of claim 1, wherein the first strap couples to the second strap by a hook and loop apparatus.

5. The vessel holder of claim 1, further comprising a recess formed along one of the first or second surfaces to partially retain at least one of the first or second straps.

6. The vessel holder of claim 1, wherein the basket further comprises:
    a base connected to the lower portion and extending generally horizontally when the vessel holder is secured to the arm of the seat, wherein the base is configured to support vessels having a smaller or stepped base while the interior surface at the lower portion supports the smaller or stepped base from tipping, and wherein the lip formed at the intersection of the upper and lower portions is configured to support vessels having a larger base while the interior surface at the upper portion supports the larger base from tipping.

7. The vessel holder of claim 1, further comprising:
    a rigid basket support integrally formed with and extending between the basket and the seat mounting portion, the rigid basket support configured to stabilize the basket.

8. The vessel holder of claim 6, wherein the upper and lower portions of the basket include at least three basket support members extending between the continuous annular periphery at the top of the upper portion to the base, each of the basket support members being spaced apart from one another to define a plurality of secondary openings extending upwardly from the base, and wherein each of the two basket openings extending downwardly from the top of the upper portion is formed in one of the basket support members so as to be spaced from the secondary openings.

* * * * *